United States Patent [19]
Nakamura

[11] Patent Number: 5,216,693
[45] Date of Patent: Jun. 1, 1993

[54] SPREAD SPECTRUM COMMUNICATIONS SYSTEM

[75] Inventor: Masaru Nakamura, Yokohama, Japan

[73] Assignee: Ricoh Company, Ltd., Tokyo, Japan

[21] Appl. No.: 791,250

[22] Filed: Nov. 13, 1991

[30] Foreign Application Priority Data

| Nov. 13, 1990 | [JP] | Japan | 2-306611 |
| Dec. 19, 1990 | [JP] | Japan | 2-412250 |
| Feb. 15, 1991 | [JP] | Japan | 3-044284 |
| Jun. 25, 1991 | [JP] | Japan | 3-181704 |

[51] Int. Cl.$^5$ .................................................. H04K 1/00
[52] U.S. Cl. ........................................... 375/1; 380/34
[58] Field of Search ............................. 380/34; 375/1

[56] References Cited

U.S. PATENT DOCUMENTS

| 4,199,059 | 1/1989 | Grindahl et al. | 375/1 X |
| 4,862,478 | 8/1989 | McIntosh | 375/1 |
| 5,063,560 | 11/1991 | Yerbury et al. | 375/1 X |
| 5,063,571 | 11/1991 | Vancraeynest | 375/1 |
| 5,081,644 | 1/1992 | Uchida et al. | 375/1 |

FOREIGN PATENT DOCUMENTS 1-228338  9/1989  Japan .

OTHER PUBLICATIONS

IEICE, pp. 33–37, Aug. 4–5, 1989, S. Fukuyama, et al., "The Merits and Applications of DS-SS Systems Using RZ-Codes".
IEICE, pp. 101–104, Aug. 4–5, 1989, H. Habuchi, et al., "A Code Division Multiplex Using Manchester Coded M-Sequence".
IEICE, pp. 35–38, Oct. 25–26, 1990, M. Sata, et al., "Parallel Spread-Spectrum Communication with Rejection Technique of Co-Channel Interference".
RCS, pp. 25–31, Apr. 25–31, 1988, A. Kazihara, et al., "A Simple Coherent PN Code Tracking System of Spread Spectrum Communications".

Primary Examiner—Tod Swann
Attorney, Agent, or Firm—Oblon, Spivak, McClelland, Maier & Neustadt

[57] ABSTRACT

A spread spectrum communications system in which one of a transmitter or a receiver uses a PN code sequence while another side uses a code sequence to which is used constant pattern signals comprising an arbitrary combination of three values of positive, negative and zero for each code of a same PN code sequence. A correlator performs cross correlation process of a code sequence to which the PN code sequence and the pattern signal have been used.

23 Claims, 11 Drawing Sheets

FIG.2(a)
CORRELATION CHARACTERISTIC OF
FIG.1(a) AND FIG.1(b)

FIG.2(b)
CORRELATION CHARACTERISTIC OF
FIG.1(a) AND FIG.1(c)

FIG.2(c)
CORRELATION CHARACTERISTIC OF
FIG.1(a) AND FIG.1(d)

FIG. 3

FIG. 7(a) PN CODE

FIG. 7(b) (M-RZ)-PN CODE

FIG. 7(c) CROSS CORRELATION

FIG.8(a) PN CODE PN(t)
FIG.8(b) (M-RZ)·PN
FIG.8(c) d1×PN(t+T) (−)
FIG.8(d) d2×PN(t+2T) (−)
FIG.8(e) d3×PN(t+3T) (−)
FIG.8(f) TRANSMIT CODE Σ(b)∼(e)
FIG.8(g) CROSS CORRELATION (a) AND (f)

FIG. 9(a) TRANSMITTER
FIG. 9(b) RECEIVER

FIG.12

SPREAD SPECTRUM COMMUNICATIONS SYSTEM

BACKGROUND OF THE INVENTION

1. Field of the Invention

The present invention relates to a spread spectrum communications system, and more particularly to a spread spectrum communication system of the direct sequence type. The present invention includes a synchronous control, a modulation/demoudulation system and radio communication in spread spectrum communications.

2. Discussion of the Background

In general, a spread spectrum communications apparatus of the spread spectrum communication system of a direct sequence type correlates a spread signal (Pseudo Noise code) of a transmitting signal with a receiving signal so as to synchronize the transmitting signal with the receiving signal. The resulting auto correlation value is made a control signal for the control of the clock frequency for a PN code. The PN code is a spread signal of a transmitter side of the apparatus. Japanese Patent Laid Open Publication No. 1-228338 discloses an example of a code synchronization circuit. The code synchronization circuit is a so called delay locked loop type circuit. The delay locked loop type circuit correlates each spread signal with a received signal at two points in a code sequence on the receiving side, and the control signal is a differential signal between both the correlation value determined with the received signal and the spread signal. This control signal controls the frequency of the clock generator for code and synchronizes each spread signal with a receiving signal in the receiver side.

In addition, practically all spread spectrum communications systems of the direct sequence type handle positive and negative binary numbers. However, the code sequence is not necessarily defined by a binary number, if the code sequence is given the necessary auto correlation characteristics. For example, in 'The Merits and Applications of DS-SS Systems Using RZ-codes: FUKUYAMA, TADOKORO, The Institute of Electronics Information and Communication Engineers, SSTA 89-16 pp. 33~37, Aug. 4th~5th 1989' use of a return zero (RZ) code that outputs zero only a required number of times within one code of a PN code is disclosed. The PN code itself obtains a positive and a negative value and so the entire PN code sequence consists of three values, positive, negative and zero. However, one PN code can consist of only two values. The above literature discloses the spectrum characteristics and the auto correlation characteristics of RZ codes. Also, in Code Division Multiples Access Manchester Coded M-sequence: HABUCHI, HASEGAWA, HAKURA, The Institute of Electronics Information and Communication Engineers, SSTA 89-27, pp. 101~104 Aug., 4th~5th 1989, the correlation characteristics due to Manchester code are disclosed.

The binary codes that are expressed in M-sequences are generally used for both transmitting and receiving using the PN code used in spread spectrum communications. However, this PN code is used for obtaining the necessary auto correlation characteristics for synchronization in the receiver. The PN code itself can be of any type as long as the necessary characteristics are obtained. These necessary auto correlation characteristics for synchronization are expressed by a linear equation of auto correlation characteristics that pass through the origin of the synchronization points in the synchronization system, and a point in the vicinity thereof, and the auto correlation characteristics are such that they are close to zero for another point. The auto correlation characteristics in a synchronous system reach a peak value nearby the synchronization points, and reach a zero value near an auto correlation characteristic point thereof.

Return-zeroed PN code for turning off the output of the PN code for a constant time, and a Manchester coded PN code have been proposed as variations of the above described PN code. In particular, the Manchester coded PN code enables the circuit to be easily constituted, and is advantageous in synchronous systems.

On the other hand, with the Manchester coded PN code, the linear region becomes smaller when digital modulation of the transmitting signal is performed and when the PN code is used simply to synchronize the transmitting signal (PN code) with the receiving signal. Accordingly, the large auto correlation output consumes much energy at points other than those in the vicinity of the points of synchronization, and there is also a high level of interference signals with respect to other types of communications.

One example of a multiplexing method used in conventional SS communications is that previously described in The Merits and Applications of DS-SS Systems Using RZ-codes: FUKUYAMA, TADOKORO, The Institute of Electronics Information a Communication Engineers, SSTA 89-16 pp. 33~37, Aug. 4th~5th 1989. This literature describes a method by which a plural number of PN codes for a plural number of data are prepared, each of the data are multiplied by respectively different PN codes, the codes are multiplied and spread, and the spread signals are transmitted simultaneously. However, this method requires many PN code generators and multiplexers.

On the other hand, these is also a system disclosed in 'Parallel Spread-Spectrum Communications with Rejection Techniques of Co-Channel Interference,' SATO, The Institute of Electronics Information and Communication Engineers, SSTA 90-39, Oct., 25th~26th, 1990. This disclosed system uses RZ code that zeroes the output by a constant proportion within a single chip of a PN code, and that can be used for spread spectrum (SS) communications in the same manner as a normal PN code.

In this manner, the multiplex method of conventional SS communications can be performed as described above, by code-division multiplexing. Multiplexing in SS communications involves the use of a plural number of different PN codes, each PN code being multiplied by a respectively different data signal and transmitted in parallel. However, with this method, it is necessary to have many code generators and multiplexers so that the circuit configuration becomes complex. In one method for avoiding this problem, data signals are multiplied by signals that each have a different phase of one PN code, and then transmitted in parallel. In another method, return-zeroed PN code is used. This method has a state where there is zero output and so power consumption is less and radiated noise is reduced. However, when the output of the circuit is zero such an output is the same as if the circuit is not operating at all and so this non-operating time represents a waste of time.

Moreover, the previously proposed 'Japanese Patent Laid Open Publication No. 240266-1990' discloses the use of mutual auto correlation between a normal PN code and Manchester-coded PN code, and realizes a simple demodulation method using the clock pulse auto correlation.

SUMMARY OF THE INVENTION

Accordingly, an object of the present invention is to provide a novel and effective spread spectrum communications system wherein the previously described problems are eliminated.

A more specific object of the present invention is to provide a spread spectrum communications system wherein RZ code of a Manchester coded PN code is used and the auto correlation characteristic becomes linear and symmetrical in the vicinity of the origin, and an auto correlation value of zero is obtained for a point other than the vicinity of the origin.

The above objects are achieved by a spread spectrum communications system comprising:

a transmitter having first generating means for generating a first code signal which periodically varies, modulation means for modulating the first code signal in accordance with input information supplied to the transmitter, and output means coupled to the modulating means, for outputting an information signal which is modulated by the modulation means; and a receiver which receives the information signal from the transmitter, the receiver having second generating means for generating a second code signal which periodically varies, the second code signal having a predetermined relationship with respect to the first code signal, synchronizing means for synchronizing the second code signal with the information signal based on an auto correlation relationship between the second code signal and the information signal, and demodulation means for demodulating the information signal synchronized with the second code signal in a state where the synchronizing means synchronizes the second code signal with the information signal so that reproducing data corresponding to the input information supplied to the transmitter is obtained, wherein one of the first and second code signals varies in accordance with a first code sequence which is a pseudo noise code sequence divided into a plurality of chips, and another one of the first and second signals varies in accordance with a second code sequence formed of a plurality of chips each of which corresponds to one of the chips of the pseudo noise code sequence, each of the chips of the second code sequence being formed of a first divided period having a positive value, a second divided period having a zero value and third divided section having a negative value.

DESCRIPTION OF THE PREFERRED EMBODIMENTS

Figure 1:
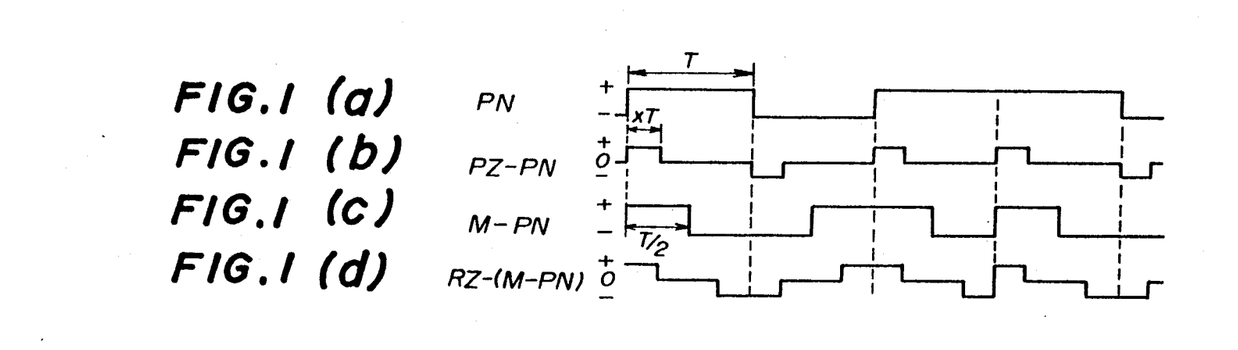
FIG. 1a, 1b, 1c and 1d is a view showing one portion of a PN code sequence, RZ code and Manchester code sequence.
Figure 2A:
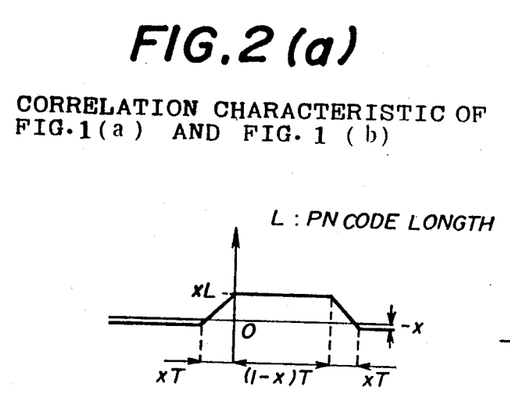
FIG. 2a, 2b and 2c is a view showing the mutual auto correlation characteristics of the code shown in FIG. 1.
Figure 2B:
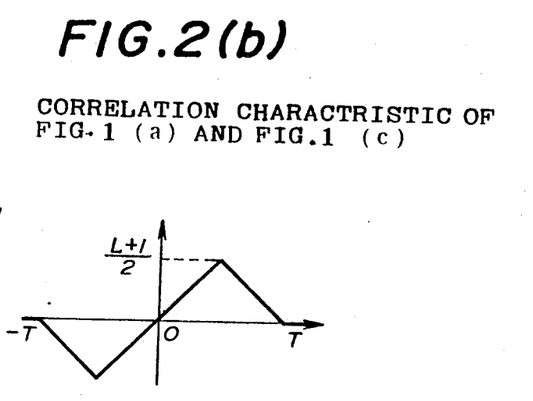
Figure 2C:
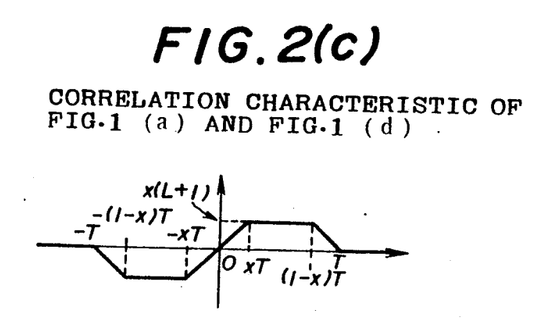

FIGS. 1(a) through (c) show a PN code that has been return zeroed, and a PN code that has been Manchester coded. FIG. 1 (a) shows a PN code, FIG. 1(b) shows a PN code (RZ-PN) that has been return zeroed, and FIG. 1(c) shows a PN code (M-PN) that has been Manchester coded. In addition, FIG. 1 (d) shows an example of a PN code (RZ-(M-PN))that has been subjected to both return zeroing and Manchester code, and which is used in the present invention. In addition, the cross correlation characteristics for the codes of FIG. 1 are shown in FIGS. 2(a) through (c). FIG. 2(a) shows the auto correlation characteristics for the PN code of (PN) FIG. 1(a) and the auto correlation characteristics for the RZ code (M-PN) of FIG. 1(c). FIG. 2(b) shows the auto correlation characteristics for the PN code of (RZ-PN) FIG. 1(b). FIG. 2(c) shows the auto correlation characteristics for the PN code (PN) of FIG. 1(a) and the return zero and Manchester coded PN code (RZ−(M−PN)) of FIG. 1(d).

In FIG. 2, L represents the PN code length. In FIG. 2(a), the auto correlation peak value for the RZ code drops because of the RZ code and the peak portion of the auto correlation characteristic becomes flatter, so that a plateau shaped characteristic is obtained. On the other hand, the auto correlation characteristic shown in FIG. 2(b) is linear and symmetrical in the vicinity of the origin in FIG. 2(b).

With respect to FIG. 2(c) which shows the cross correlation characteristic between FIG. 1(d) (RZ−(M−PN)) and FIG. 1(a) which is one example of a PN code, a shape of the correlation characteristic is origin symmetry, and the auto correlation peak of the auto correlation characteristic is plateau shaped. Through the use of (RZ−(M−PN)), the auto correlation characteristic becomes linear in the vicinity of the auto correlation characteristic in FIG. 2(c), and an ideal synchronous control signal for which the auto correlation value is zero is obtained for points other than the origin in FIG. 2 (c). In addition, when the time that it takes for the auto correlation value to become zero is increased, the transmitter's output drops with hardly any loss of its synchronous characteristic. Accordingly, it is possible to reduce the interference to other stations.

One of the methods for giving diversity to the auto correlation characteristic is an extension of the method described above, and involves dividing the time (T) for a single PN code into several portions, allocating one of the three values of positive, negative and zero to the divided time, and repeating a constant pattern for each of the PN codes.

Figure 3:
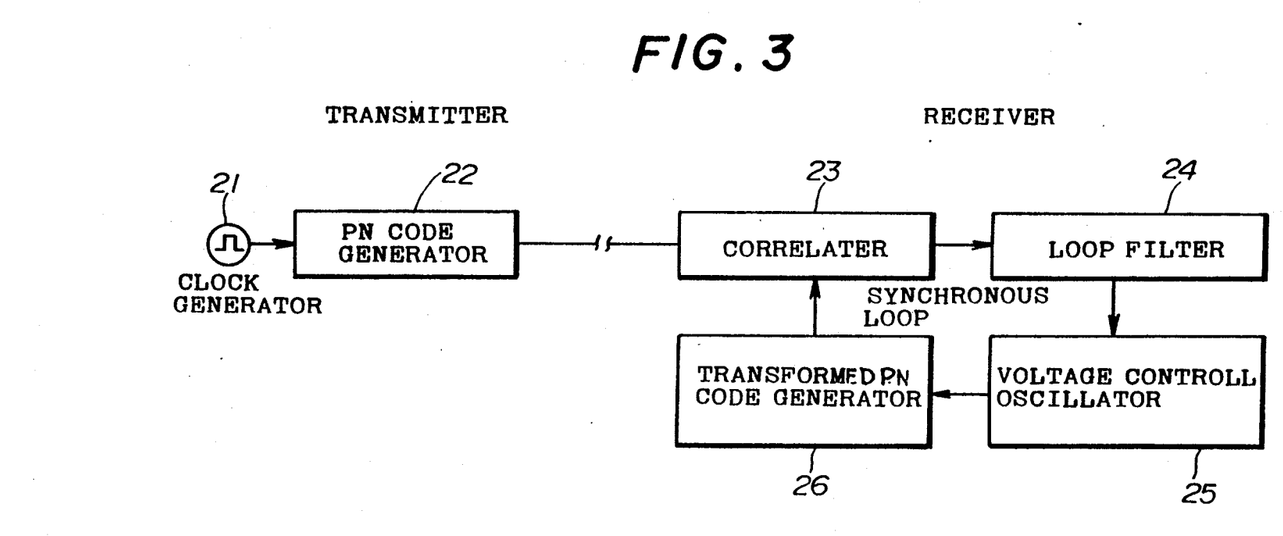
FIG. 3 is a view showing a configuration of a synchronous method of the spread spectrum communications system according to the present invention.

FIG. 3 is a view showing a configuration of a synchronous method of the spread spectrum communication system according to the present invention. The circuit of FIG. 3 is comprised of a clock generator 21, a PN code generator 22, a correlator 23, a loop filter 24, a voltage control oscillator 25 and a transformed PN code generator 26.

Figure 4:
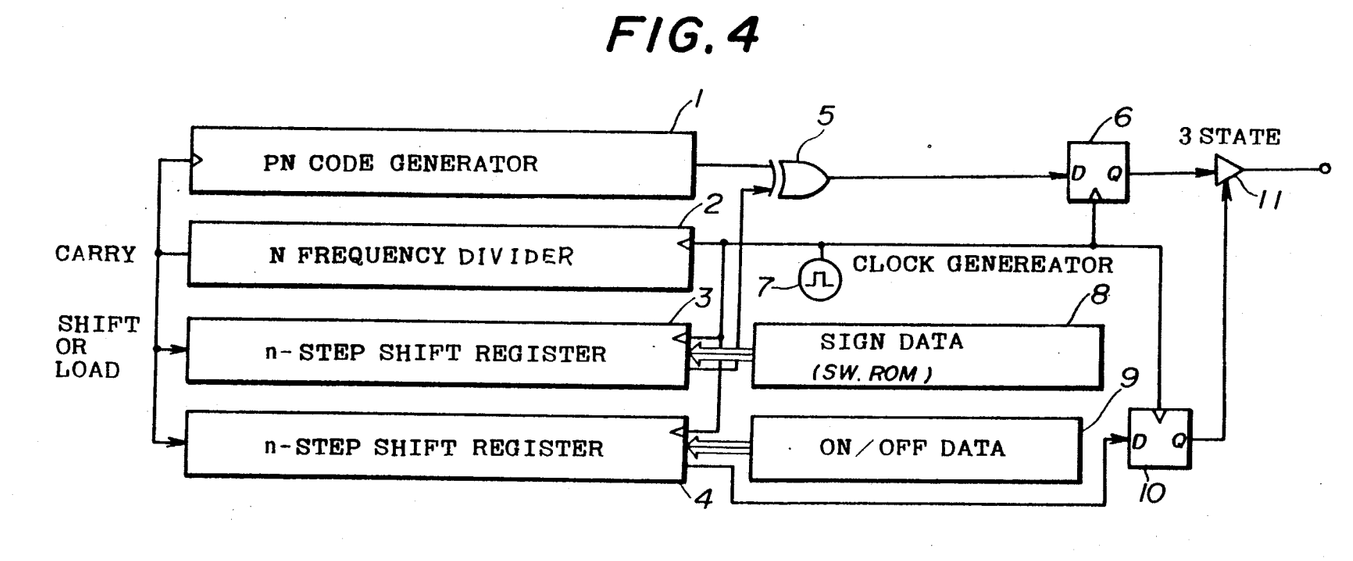
FIG. 4 is a view showing a configuration of the transformational PN code generator of the spread spectrum communication system of the present invention.

FIG. 4 is a view showing a configuration of the transformed PN code generator 26 of the spread spectrum communications system of the present invention.

With this communications system, simplification of the generator 26 is achieved by dividing one chip of the PN code into equal or not equal n parts and respectively giving each of the divided parts one value. In addition, a PN code generator 1 uses the carry signal that has been n-divided by a n-frequency divider 2 into the clock signals. Accordingly, the PN code is renewed for each clock generated by a clock generator 7. On the other hand, the positive and negative data that has three values with respect to one code is stored in a positive/negative data storage portion 8, and the ON/OFF data is stored in an ON/OFF data storage portion 9. The positive/negative data storage portion 8 and the ON/OFF data storage portion 9 are set inside a ROM or switches.

The data of the positive/negative data storage portion 8 is stored to the shift register 3 when carry signals are generated by a clock generator 7. The data of the ON/OFF data storage portion 9 is stored to the shift register 4 when carry signals are generated by a clock generator 7.

The data that is stored to the shift register 3 is read in accordance with clock to the exclusive-OR circuit 5. The data that is stored to the shift register 4 is read in accordance with clock to the flip flop 10. Consecutively, the PN code and the positive/negative data have the exclusive-OR logical value output at an EX-OR circuit 5. The exclusive-OR logical value is finally input to the PN code generator 1. A three-state buffer 11 depending on the ON-OFF data from ON-OFF data storage portion 9 is made into three values of ON and OFF.

Moreover, flip flops 6, 10 of FIG. 4 are provided inside the transformed PN code generator 26 to achieve timing and avoid glitches in the output signals. In addition, the flip flops 6, 10 are merely one example of a circuit, and one other method of obtaining such output signals involves for example, writing data to a ROM or reading it out in accordance with a counter. The auto correlation characteristics can be changed by changing the data output by generator 26.

The example shown in FIG. 4 uses the PN code generator 26 of the present invention on the receiver side but PN code generator 26 can alternatively be used on the transmitter side thereof. The correlator 23 of the receiver portion first calculates the cross correlation of the transformed PN code (the output signals of a circuit such as that shown in FIG. 4) of the receiver, and the PN code of the transmitter portion. The output signals having an auto correlation value control the voltage control oscillator 25 via the loop filter 24. The output of the loop filter 24 is input to the transformed PN code generator 26. The transformed PN code generator 26 synchronously controls the transmitting signal by the transformational PN code. Moreover, in this case, when a pattern of the correlation characteristics that has a linear characteristic that crossed the origin of FIG. 2(d) in the vicinity thereof is selected as the constant pattern used for transmission of the PN code, the receiver has only one correlator.

Figure 5:
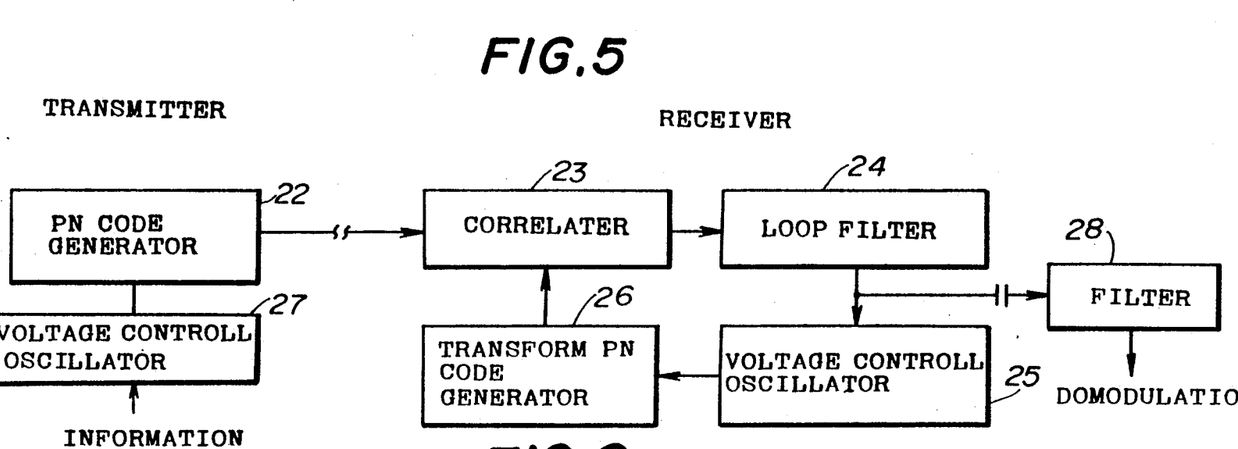
FIG. 5 is a view showing an example of a demodulation method of the spread spectrum communications system according to the present invention.

FIG. 5 is a view showing an example of a modulation/demodulation method of the spread spectrum communications system of the present invention. Those elements of spread spectrum communication system shown in FIG. 5 that correspond to those of the system shown in FIG. 3 are indicated by corresponding numerals and descriptions thereof are omitted. The elements of the system shown in FIG. 5 that differ from those of the system shown in FIG. 3 are the voltage control generator 27 and the filter 28. The circuit of this configuration uses a method that modulates the clock signal from the clock generator 21 of FIG. 4 by information signals. A method such as that shown in FIG. 3 can not modulate by binary phase shift keying (BPSK) while it is possible to do so with another method, such as a normal direct sequence method. In an example of a method where BPSK is possible, the BPSK modulation modulates a clock for driving the PN code generator 22 by the information signals, and the transmitter transmits the modulated signal to the receiver. With this method, demodulation is performed by using the synchronous loop of the loop filter 24 in FIG. 3. The auto correlation value output from the correlator 23 changes in proportion to the clock frequency output from the transmitter. Accordingly, the correlator 23 correlates the receiving signal from the PN code generator 22 with the output signal from the transformed PN code generator 26. In this method, auto correlation output signals are taken from the correlator and demodulation of information signals by passing them through a filter 28 is performed.

Figure 6:
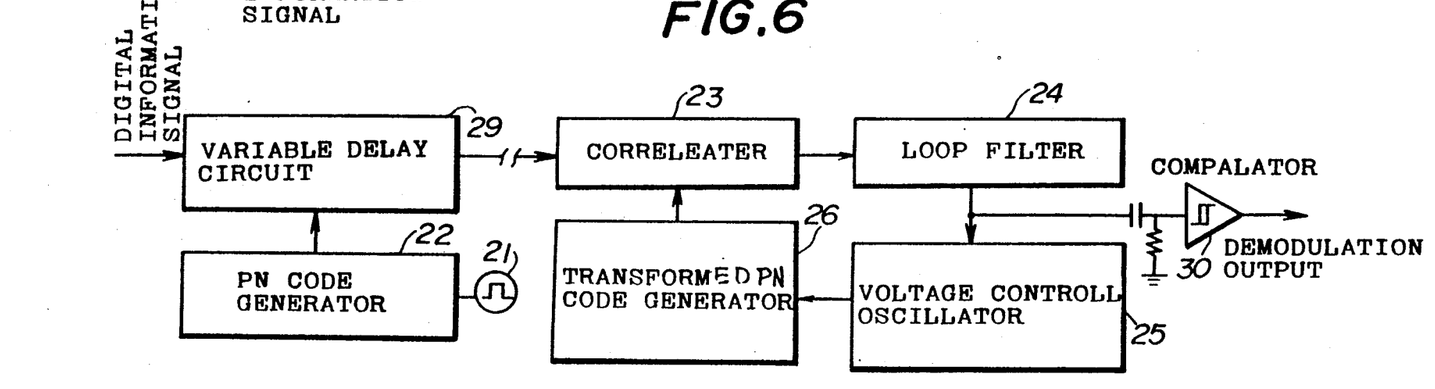
FIG. 6 is a view showing an example of an application of the spread spectrum communications system of the present invention to a system performs digital demodulation of the phases of PN codes.

FIG. 6 is a view describing an example of an application of the communications system of the present invention to a system that performs digital demodulation of the phases of PN codes. Those elements of the communications system shown in FIG. 4 that correspond to those of the system shown in FIG. 4 are indicated by corresponding numerals and descriptions thereof are omitted. The elements of the system shown in FIG. 6 that differ from those shown in FIG. 4 are the variable delay circuit 29 and the comparator 30. In the transmitter, digital information signals are input to the variable delay circuit 29 and the phases of signals from the PN code generator 22 are input to the variable delay circuit 29. The variable delay circuit 29 modulates the phase of the signal using digital signals. The demodulation process uses a synchronous circuit the same as that shown in FIG. 3. When the phase of the PN code on the transmitter side changes, the auto correlation output outputs signals of either a positive or negative spike type. Data demodulation is performed by the comparator 30 having a hysterisis function which perceives the auto correlation output. Moreover, the embodiment described above has a synchronous system but it is of course possible for the communications system of the present invention to be used in an a synchronous system.

The following is a description of a spread spectrum communication system that performs multiplexing in the signal transmitting.

Figures 7A, 7B, 7C:
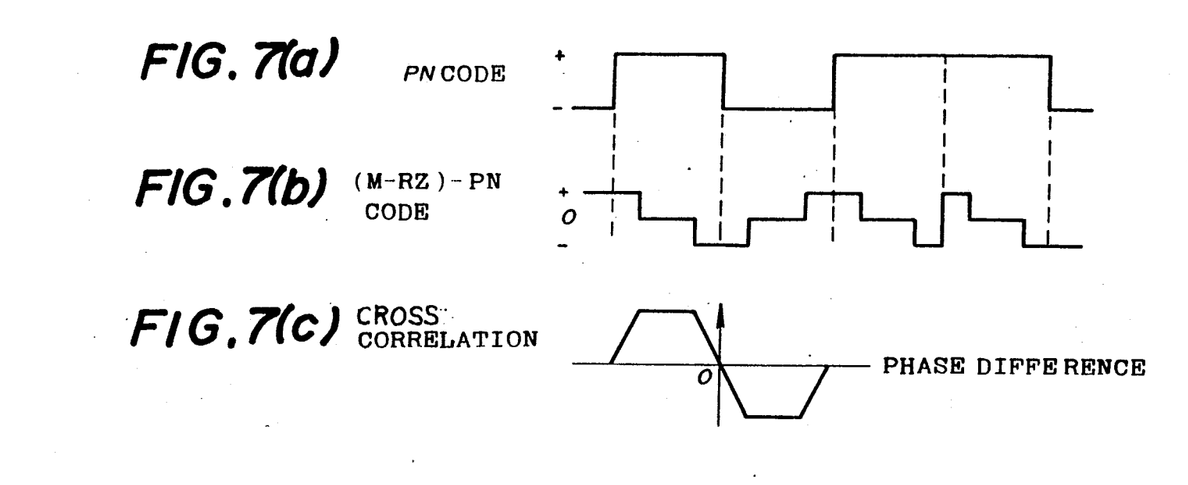
FIGS. 7a, 7b and 7c shows the correlation characteristics of PN codes and Manchester coded RZ codes.

FIGS. 7(a) through (c) show the auto correlation characteristics of a normal PN code and a Manchester-coded RZ-PN code. FIG. 7(a) shows a PN code, FIG. 7(b) shows a manchester coded RZ-PN code, and FIG. 7(c) shows the cross correlation between a PN code and a Manchester coded RZ-PN code. The synchronous control signal is made to synchronize the PN code output from the transmitter with the auto correlation output from the correlator. In addition, it is possible for the data transmission of the transmitter to modulate only one of the clock phases. Data reproduction of the receiver can be realized by waveform rectification of the synchronous control signals.

In the present embodiment time division multiplexing of the auto correlation output is performed.

Figure 8A:
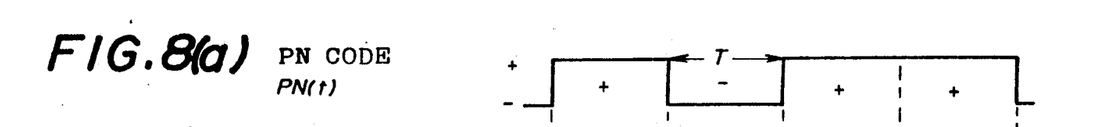
FIGS. 8a, 8b, 8c, 8d, 8e, 8f, 8g shows the configuration of a code sequence used in the spread spectrum communications systems, and the correlation characteristics of the PN codes used.
Figure 8B:
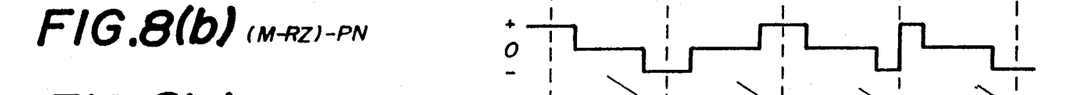
Figure 8C:
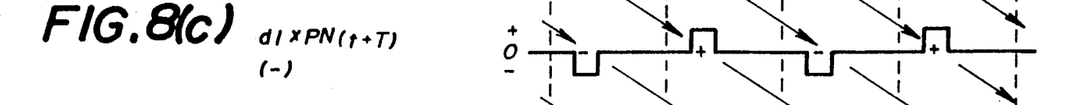

FIGS. 8(a) through (g) show an example of the configuration of a code sequence used in the spread spectrum communications system, and the auto correlation characteristics of the PN code used. FIG. 8(a) is a PN code of the M-sequence type that forms the basis, and FIG. 8(b) ((M−RZ)−PN) is a PN code that has been Manchester coded and then return zeroed. FIG. 8(c) shows when the period of the zero of ((M−RZ)−PN) in FIG. 8(b) has been divided equally into three periods, with the output being the product (T) of the first data of the PN code that has its phase shifted a one-chip period, for only a first period, as expressed by $$d1 \times PN(t+T)$$

Figure 8D:
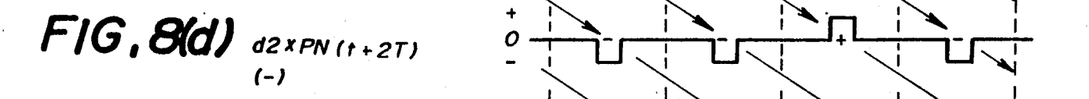

In the same manner, FIG. 8(d) shows when the period of the zero of ((M−RZ)−PN) in FIG. 8(b) has been divided equally into three periods, with the output being the product (2T) of the second data of the PN code that has its phase shifted a two-chip portion for only a second period, as expressed by $$d2 \times PN(t+2T)$$

Figure 8E:
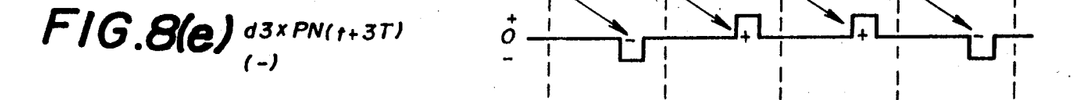

Again in the same manner, FIG. 8(e) shows when the period of the zero of FIG. 8(b) ((M−RZ)−PN) has been divided equally into three periods, with the output being the product (3T) of the third data of the PN code that has its phase shifted a three-chip portion for only a third period, as expressed by $$d3 \times PN(t+3T)$$

Moreover, for the purpose of simplifying the description of data by this formula, it will be assumed that the periods are equal, and the phase differences are also made shifted 1-, 2-or 3-chip portions but it is not necessary for these periods to be equal and the phase differences can also be arbitrarily selected as long as the auto correlation peak region does not overlap other phases of the signal.

Figure 8F:
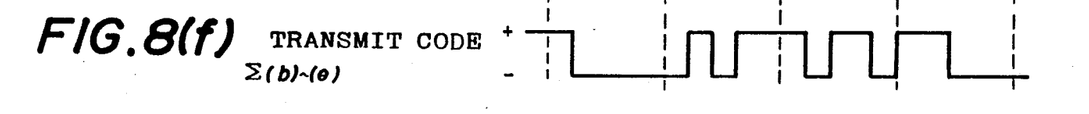

FIG. 8(f) shows transmit signals obtained by overlapping the signals shown in FIG. 8(b) through (e). A combination of these transmit code does not overlap the auto correlation peak, so these signals are actually obtained by successively switching the signals shown in FIG. 8(b) through (e).

Figure 8G:
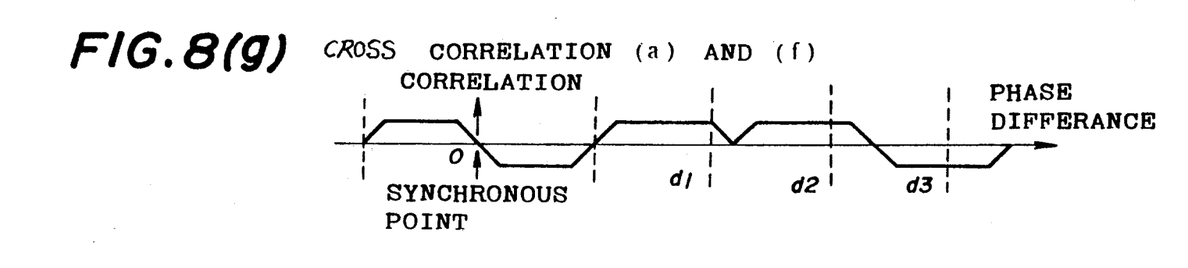

FIG. 8(g) shows the auto correlation characteristics of the transmit code shown in FIG. 8(f) that are the same as those of the code sequence shown in FIG. 8(a). A data demodulation process uses the auto correlation characteristic in the vicinity of the origin in FIG. 8(g) for synchronous control, and the phase of the PN code of the transmitter side used in data modulation and the synchronous PN code are combined together by a delay circuit and inverse-spread by another correlator. In this manner, it is possible to demodulate arbitrary data of the data d1 through d3 by changing the delay time used in the delay circuit.

Figure 9A:
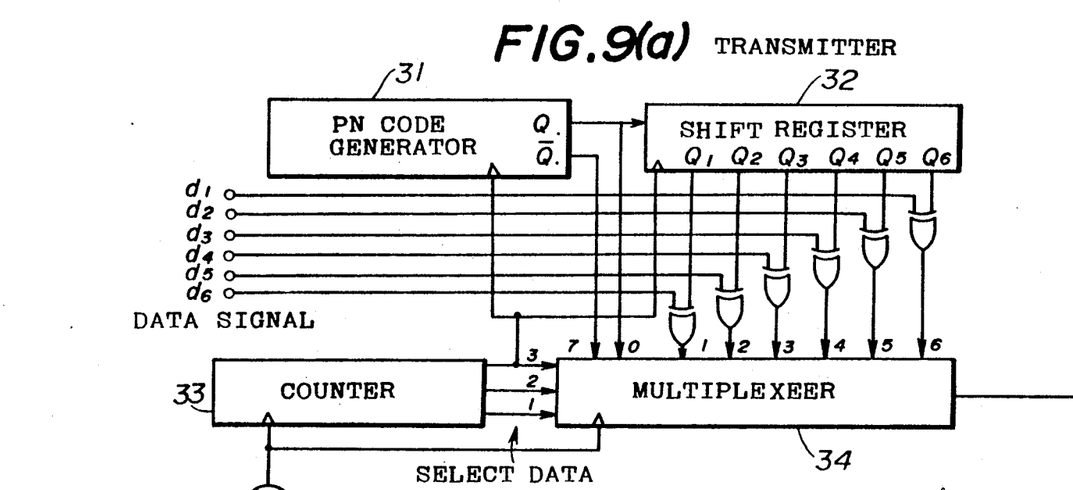
FIGS. 9a and 9b is a view showing the configuration of a embodiment of the spread spectrum communications system according to the present invention which uses the code sequence shown in FIG. 8.
Figure 9B:
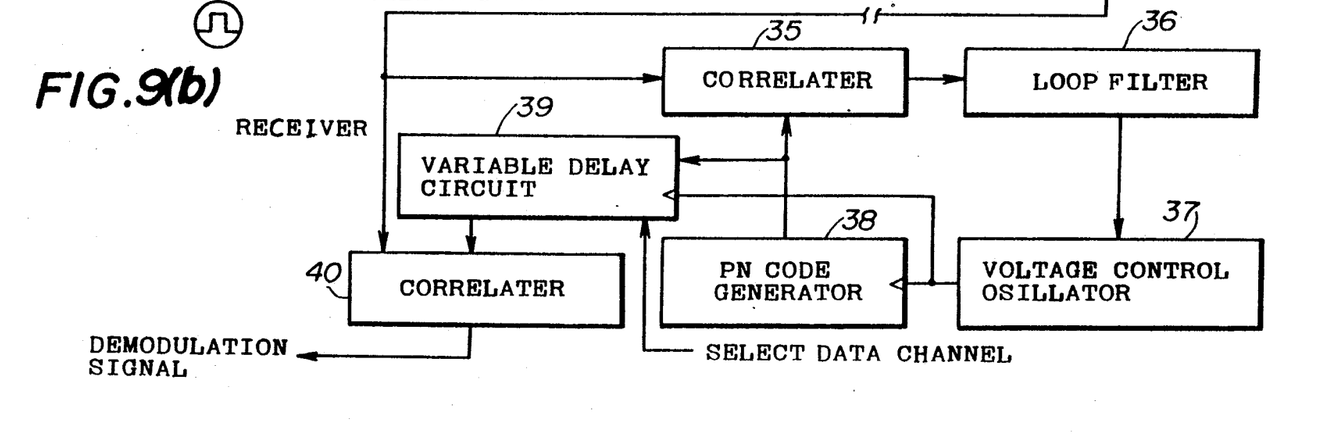

FIG. 9 is a view showing the configuration of the spread spectrum communications system according to the present invention which uses the code sequence shown in FIG. 8. FIG. 9(a) shows the configuration of the transmitter and FIG. 9(b) shows the configuration of the receiver.

In the transmitter in FIG. 9 (a), the clock is divided into eight period by a counter 33 and is used as the clock for a PN generator 31 and the shift register 32. The output code from the PN generator 31 is delayed by the shift register 32 and the delay time obtains the PN code for chips 0 through 6. The exclusive-OR circuit takes the exclusive-OR sum of the data signals d1 through d6 and the PN code of chips 1 through 6, and inputs exclusive-OR value to a multiplexer 34. In addition, a PN generator 31 inputs a PN code ($Q_0$) for which the delay is zero and the PN code ($Q'_0$) of opposite polarity to the mulitplexer 34. Finally, the mulitplexer 34 selects one of eight signals that have been input to the multiplexer 34, in accordance with the counter value that is output from the counter 33, and obtains the transmit signals as shown in FIG. 9(f). When this is done, the multiplexer 34 outputs ($Q_0$) when the counter value is zero, outputs ($Q'_0$) when the counter value is '7', and successively switches signals with respect to d1 through d6 for other counter values.

In the receiver portion in FIG. 9(b), a correlator 35 performs the cross correlation of a normal PN code on the receiving side with the multiplexed PN code from the transmitter side, and inputs the auto correlation value output signals to the voltage control oscillator 37 via a loop filter 36. The voltage control oscillator 37 performs synchronous control for the PN code and the synchronized PN code is then input to a variable delay circuit 39. The variable delay circuit 39 harmonizes the PN code input from the voltage control oscillator 37 with the phase of the PN code with respect to required data, and then inputs the received signals and the PN code to a correlator 40. The correlator 40 inverse-spreads the PN code input from the variable delay circuit 39 and obtains the reproduction data. This reproduction data is then demodulated.

Figures 10A, 10B, 10C:
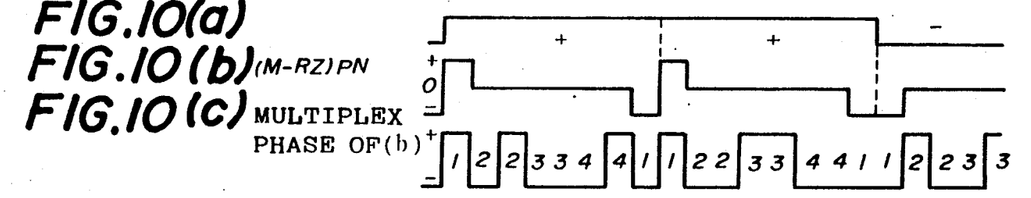
FIGS. 10(a), 10(b), 10(c) and 10(d) respectively show views of a configuration of another code system used in an example of another configuration of a code sequence used in the spread spectrum communications system according to the present invention, and showing the mutual auto correlation characteristics of multiplex the infomation code and the PN code.
Figure 10D:
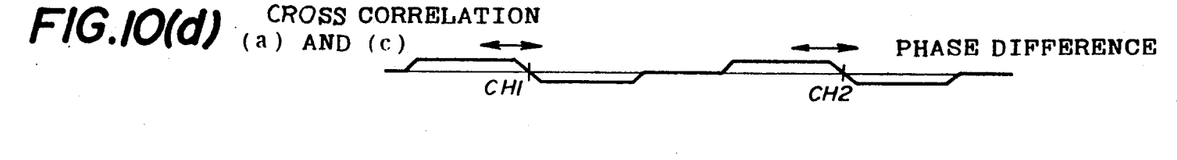

FIGS. 10(a) through (d) respectively show the configuration of another code system used in an example of another configuration of a code sequence used in the spread spectrum communications system according to the present invention, and show the auto correlation characteristics between another configuration of a code sequence and the PN code. The code used in FIG. 10 has the four codes (M−(RZ−PN)) shown in FIG. 7(b)

added thereto so that there is no overlapping of phases between each code signal, and each auto correlation characteristics of each code. The signals shown in FIG. 10 (c) divide each chip of the PN code divided into eight periods, and are allocated two data per channel. A PN code signal is modulated by phase modulation so that the correlation characteristics does not overlap with each PN code signal so that the PN code length is exactly one chip of the PN code. FIG. 10(d) shows the auto correlation characteristics of a multiplied code which multiplied the PN code by (M−(RZ−PN)) code. The auto correlation characteristics oscillate digitally to the left and right within the range of one chip due to modulation. When this occurs, the phase difference has to be set so that interference with other channels can be avoided.

Figure 11A:
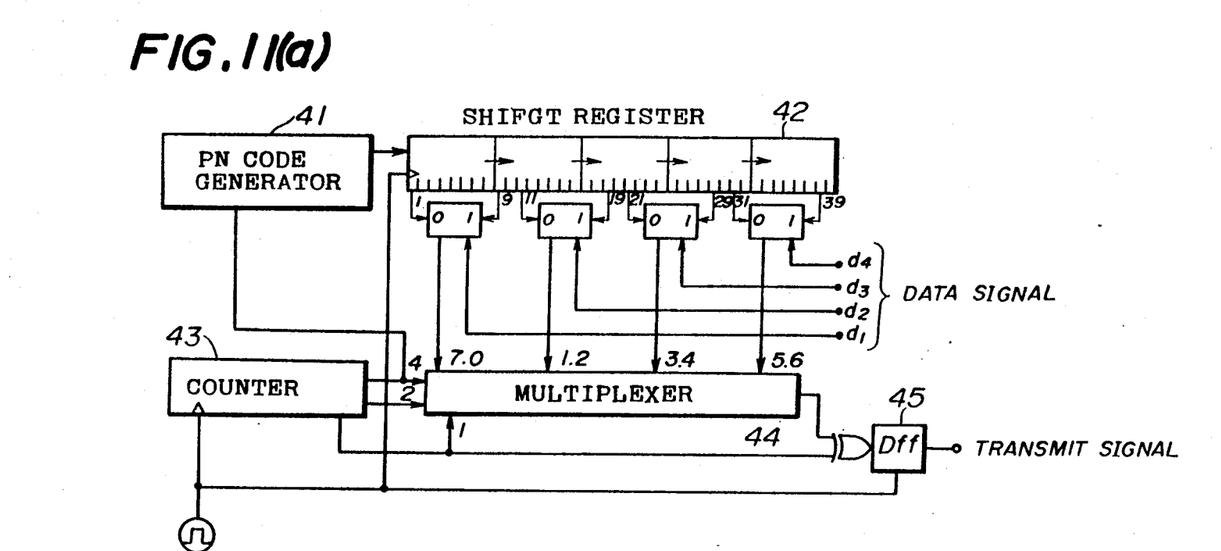
FIG. 11a and 11b is a view showing the configuration of a embodiment of the spread spectrum communications system according to the present invention which uses the code sequence shown in FIG. 10.
Figure 11B:
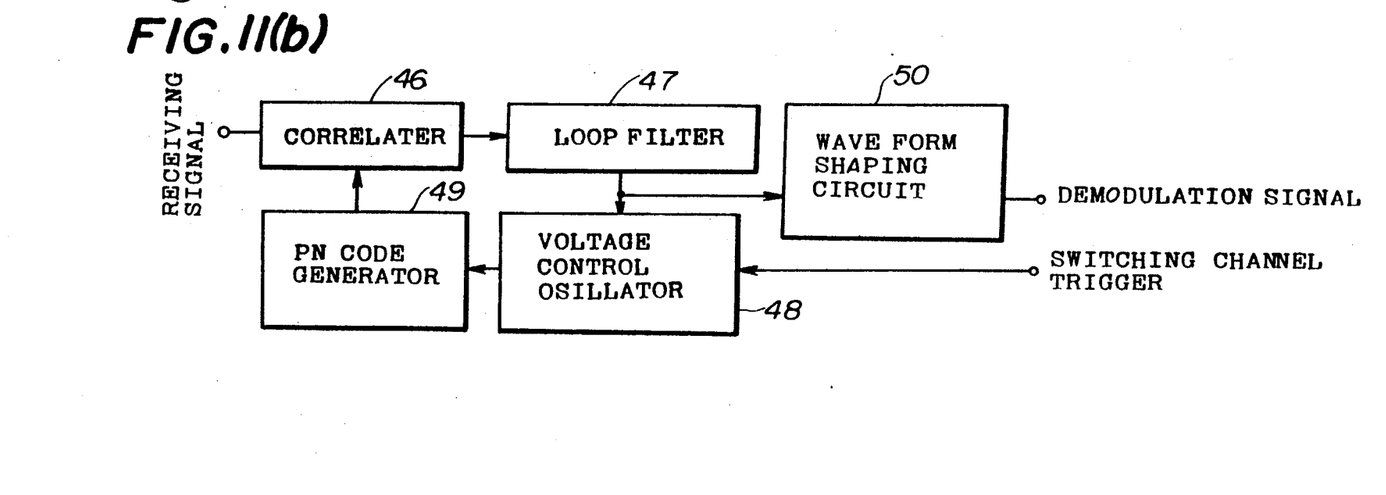

FIG. 11 is a view showing the configuration of the spread spectrum communication system according to the present invention and using the code sequence shown in FIG. 10. FIG. 11(a) shows the configuration of the transmitter and FIG. 11(b) shows the configuration of the receiver.

In the transmitter of the configuration shown in FIG. 11(a), the counter 43 divides the clock into eight, and drives the PN code generator 41. The PN code generator 41 inputs the PN codes to the shift register 42 that is driven by the original clock. The shift register generates the delay PN code with every ⅛ chip. The shift register 42 uses the output of the first and ninth steps of the shift register 42 to switch the output in accordance with the first data signals and perform phase modulation. The phase modulated signal from the shift register 42 is input to the multiplexer 44. The multiplexer 44 selects the phase modulated signals when the signals from the counter 43 are 0.7. Moreover, when the counter value input from the counter 43 is an odd number, the multiplexer 44 requires that the code for Manchester code be inverted and so takes the exclusive-OR sum of the signals that are phase modulated and the lowest order bit of the output from the counter 43. The exclusive-OR value is output to the receiver.

With respect to the other data, the transmitter takes from the shift register 42 the PN code of each different phase as shown in FIG. 11(a) and as described above, switches the flip-flop according to the data. The transmitter switches in accordance with the counter value form the counter 43 so that finally, multiplexed signals such as those of FIG. 10(c) are obtained by taking the exclusive-OR sum.

The receiver has as an input the multiplexed PN code from the transmitter. The correlator 46 on the receiver side calculates the cross correlation of the normal PN code with the multiplexed PN code from the transmitter, and inputs those output mutual correlation values to the loop filter 47. Then, the signals that are input to the loop filter 47 are input to the voltage control oscillator 48 and the waveform shaping circuit 50. The voltage control oscillator 48 performs synchronous control of the PN code, while the waveform shaping circuit 50 waveform exctifies the control signals input from the loop filter 47 and outputs demodulated signals. With the system of the present invention, it does not matter which channel synchronous there is at the beginning of receiving and so the channel switching that is performed by the voltage control oscillator 48 inputs trigger signals for channel switching externally as control signals and temporarily removes and then selects the next channel.

Figure 12:
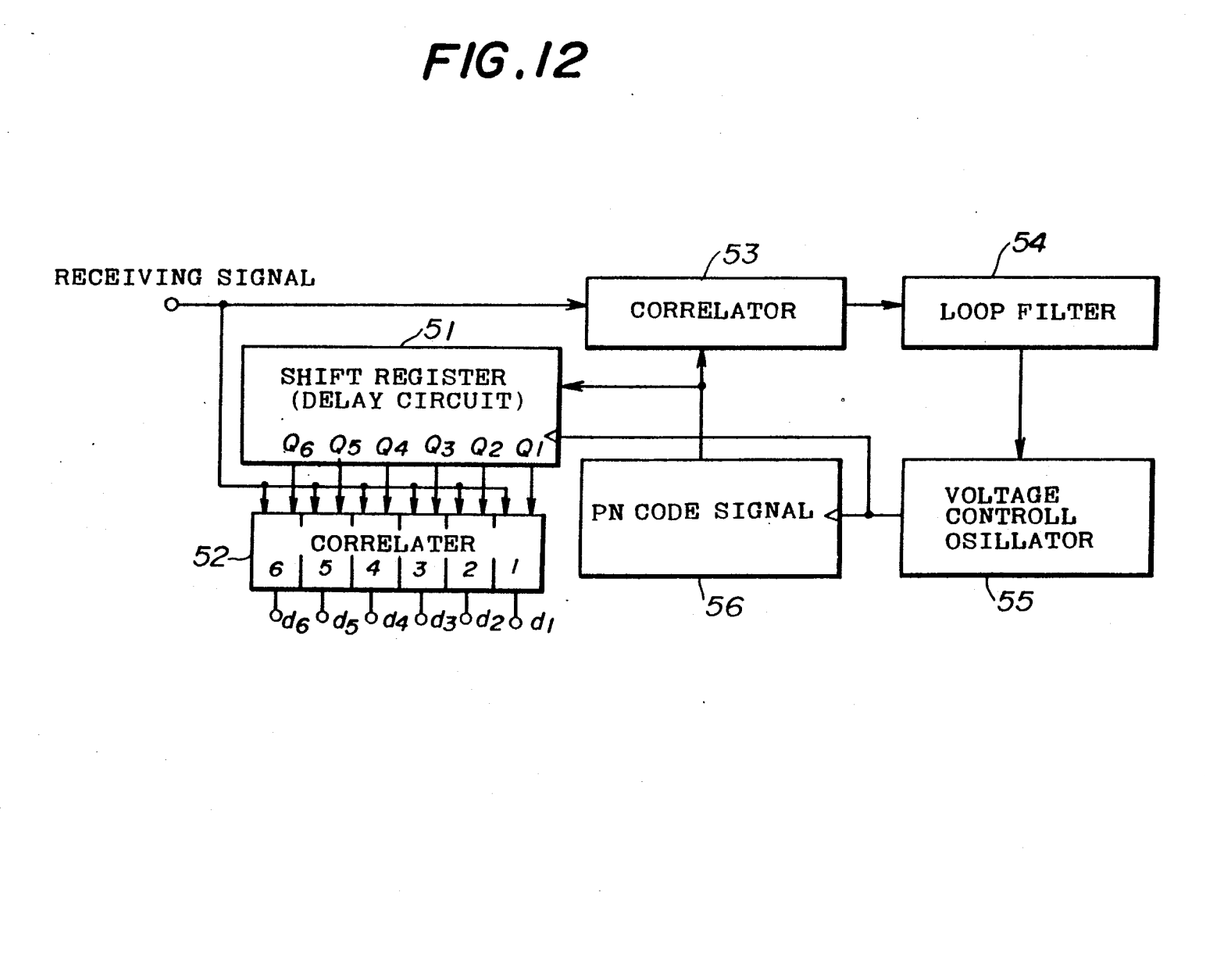
FIG. 12 is a view showing another configuration of a embodiment of the spread spectrum communications system according to the present invention.

In FIG. 9 and FIG. 11, the receiver side can demodulate only the data of one channel at any one time. The following is a description of a configuration that is provided with a plural number of demodulation portions on the receiver side and that can perform parallel demodulation. FIG. 12 is a view showing a configuration for describing the spread spectrum communications system according to the present invention.

The circuit shown in FIG. 12 is a receiver and this receiver is configured from a shift register 51, correlators 52, 53, a loop filter 54, a voltage control oscillator 55 and a PN code generator 56. On the other hand, the transmitter can be the same as the transmitter shown in FIG. 9(a) or FIG. 11(a). The following is a description of multiplexing, using the receiver of FIG. 9 (b). Moreover, the configuration of synchronizous loop and operation of the transmitter is the same as the configuration in FIG. 9. The circuit of FIG. 12 uses a shift register 51 instead of the variable delay circuit 39 of FIG. 9, and generates PN codes corresponding to each data channel. For each data channel, the correlator 52 correlates the received signals with the PN code generated by the shift register 51, and reproduces a plural number of data simultaneously. In addition, in the case of FIG. 11, the receiver is also provided with plural numbers of demodulators that operate in parallel to reproduce a plural number of data at the same time.

The following is a description of the configuration of the present invention and which is configured to have a plural number of synchronization points for performing parallel data transfer to the receiver side and therefore to enable the simultaneous receiving of parallel data.

FIG. 13 is a view showing a configuration for describing the spread spectrum communication system according to the present invention.

Figure 13A:
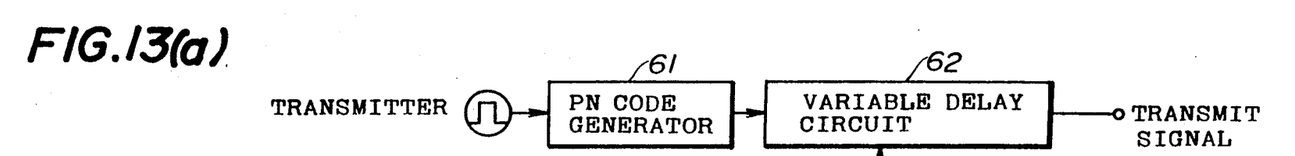
FIG. 13a and 13b is a view showing still another configuration of the spread spectrum communications system according to the present invention.
Figure 13B:
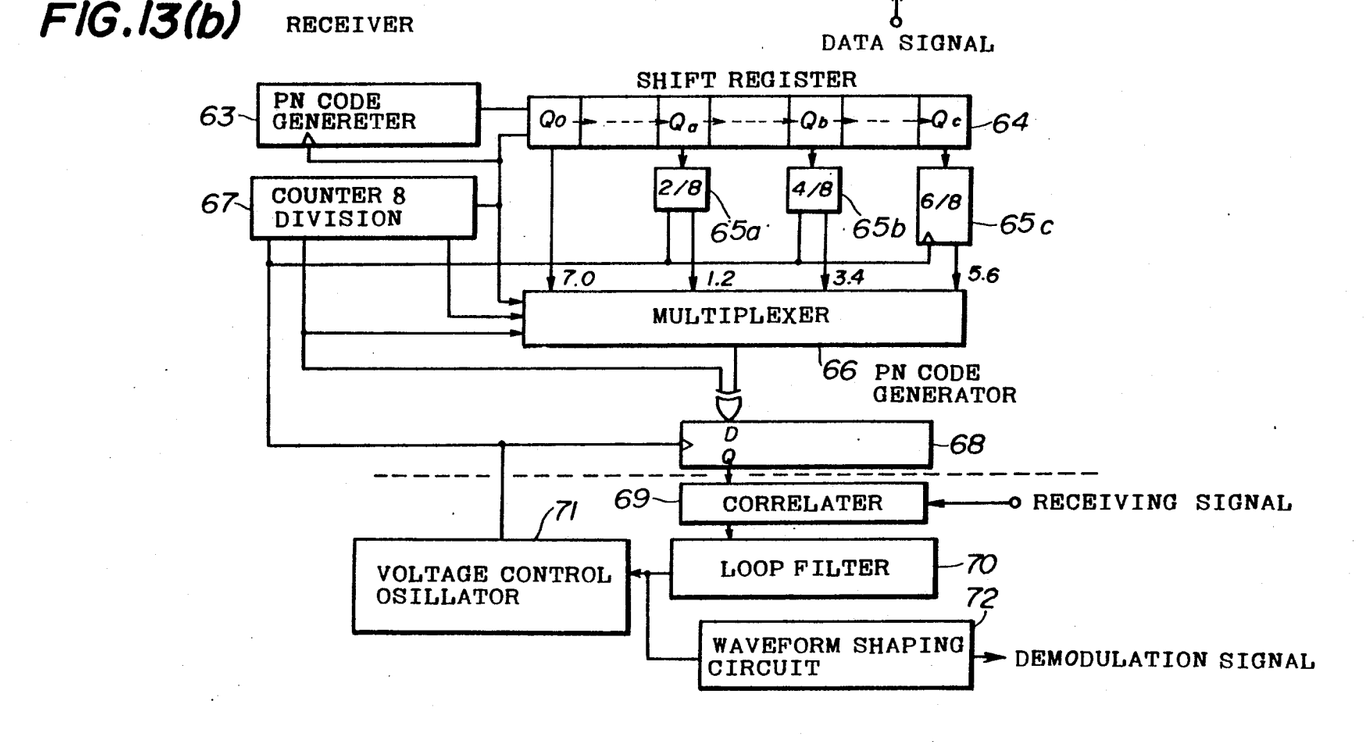

The transmitter portion of FIG. 13(a) is configured from a PN code generator 61 and a variable delay circuit 62. The receiver of FIG. 13 (a) is configured from a PN code generator 63, a shift register 64, ⅛ chip unit shift registers 65a through 65c, a multiplexer 66, a counter 67, a flip flop 68, a correlator 69, a loop filter 70, a voltage control oscillator 71 and a waveform rectifier circuit 72. This embodiment if for the purpose of high-speed initial synchronization by using the code sequence shown in FIG. 10 on the receiver. The transmitter of FIG. 13(a) is of the clock phase modulation type that uses data to modulate the phase of the PN code. FIG. 13(b) is an example of the application of the transmitter of FIG. 11(a) to the receiver. Accordingly, the receiver does not have data modulation, and so the configuration is simple. Instead, the receiver has the ⅛ chip unit shift registers 65a through 65c that perform synchronizing and demodulation. The circuit of this configuration has four points of synchronization inside one cycle of the PN code and so the synchronization time is on the average shortened to one quarter when compared to the conventional system.

What is claimed is:

1. A spread spectrum communications system comprising:
 a transmitter having first generating means for generating a first code signal which periodically varies, modulation means for modulating said first code signal in accordance with input information supplied to said transmitter, and output means for outputting a transmit signal which is modulated by said modulation means; and a receiver which receives the transmit signal from said transmitter, said receiver having second generating means for generating a second code signal which periodically varies, said second code signal having a predetermined relationship with respect to said first code signal, synchronizing means for synchronizing said second code signal with said transmit signal based on an auto correlation relationship between said second code signal and said transmit signal, and a demodulation means for demodulating said transmit signal synchronized with said second code signal in a state where said synchronizing means synchronizes said second code signal with said transmit signal so that reproducing data corresponding to said input information supplied to said transmitter is obtained, wherein one of said first and second code signals varies in accordance with a first code sequence which is a pseudo noise code sequence formed of a plurality of chips, and another one of said first and second signals varies in accordance with a second code sequence divided into a plurality of chips each of which corresponds to one of the chips of said pseudo noise code sequence, each of the chips of said second code sequence being formed of a first period having a positive value, a second period having a zero value and third period having a negative value.

2. A spread spectrum communications system as claimed in claim 1, wherein one of said first and second generating means has a signal generator for generating a three state code which varies between positive, zero and negative values in accordance with a predetermined pattern, and multiplication means for multiplying the pseudo noise code sequence by the three state code so that said second code sequence is obtained.

3. A spread spectrum communications system as claimed in claim 2, wherein said three state code has a pattern in which a first section having a positive value, a second section having a zero and a third section having a negative value are arranged in this order.

4. A spread spectrum communications system as claimed in claim 3, wherein said first period has a length of xT, the second period has a length of $(1-2x)T$, and the third period has a length of xT, where by $0<x<0.5$, and T is a total length of the PN code of the three state code.

5. A spread spectrum communications system as claimed in claim 1, wherein said synchronizing means has a correlator for correlating said second code signal with said transmit signal and for outputting a correlate value corresponding to an auto correlation relationship between a control signal and said transmit signal, and has a voltage control oscillator to which said auto correlation value is supplied, said voltage control oscillator to which said auto correlation value is supplied controlling said second code signal so as to synchronize said second code signal with an input data signal.

6. A spread spectrum communications system as claimed in claim 1, wherein said second code signal generated by said second generating means of said receiver varies in accordance with the pseudo noise sequence.

7. A spread spectrum communications system as claimed in claim 4, wherein said demodulation means has a wave-form shaping circuit which generates said correlate value and demodulates said transmit signal in accordance with said auto correlation value.

8. A spread spectrum communication system comprising:

a transmitter having reference signal generating means for generating a reference signal which periodically varies in accordance with a pseudo noise code sequence formed of a plurality of chips, signal generating means for generating a plurality of code signals based on said reference signal, each of said code signals periodically varying in accordance with the pseudo noise code sequence, and phases of said code signals differing from each other, modulation means for modulating each of said code signals in accordance with a corresponding one of input data sequences supplied to said transmitter, multiplexing means for multiplexing the code signals which are modulated by said modulation means so that a multiplex signal is obtained, said multiplex signal varying in accordance with a code sequence formed of a plurality of chips each of which corresponds to one of the chips of said code sequence and each having a first section, a second section and a third section which are arranged in this order, the first section having a first predetermined value, the third section having a second predetermined value, and each of the first and second predetermined values in the code signals which are modulated by said modulation means are arranged in the second section, and outputting means for outputting a transmit signal which is obtained based on the multiplex signal;

a receiver which receives the transmit signal from said transmitter, said receiver having a code signal generating means for generating a second code signal which periodically varies in accordance with the pseudo noise code sequence, synchronizing means for synchronizing the second code signal with one of a plurality of components corresponding to the code signals multiplexed in said transmit signal based on an auto correlation relationship between said second code signal and said transmit signal, and demodulation means for demodulating the transmit signal in synchronization with the second code signal in a state where said synchronizing means synchronizes said second code signal with said one of the plurality of components corresponding to the code signals multiplexed in said transmit signal so that reproducing data corresponding to one of a plurality of data sequences supplied to said transmitter is obtained.

9. A spread spectrum communications system as claimed in claim 8, wherein said first predetermined value is a positive value, and said second predetermined value is a negative value.

10. A spread spectrum communications system as claimed in claim 8, wherein said first predetermined value is a negative value, and said second predetermined value is a positive value.

11. The spread spectrum communication system as claimed in claim 8,
wherein said modulation means has a shift register which shifts a phase of said first code signal, and generates a delay pseudo noise code which is inputted to said output means.

12. The spread spectrum communication system as claimed in claim 8,
wherein said multiplexing means has a multiplexer which selects an output signal corresponding to a predetermined signal.

13. The spread spectrum communications system as claimed in claim 8,
wherein said modulation means has an exclusive-OR circuit for said data signal and said first code signal.

14. The spread spectrum communications system as claimed in claim 8,
wherein said second code generating means includes a shift register which generates a phase of said pseudo noise code corresponding to each data channel of said transmit signal.

15. The spread spectrum communications system as claimed in claim 8,
wherein demodulation means includes a plural number of said correlator for demodulating several data in said one chip of said pseudo noise.

16. A spread spectrum communications system comprising;
a transmitter having reference signal generating means for generating a reference signal which periodically varies in accordance with a pseudo noise code sequence formed of a plurality of chips, signal generating mean for generating a plurality of code signals based on said reference signal, each of said code signals periodically varying in accordance with the pseudo noise code sequence, and phases of said code signals differing from each other, modulation means for modulating each of said code signals in accordance with a corresponding one of input data sequences supplied to said transmitter, multiplexing means for multiplexing the code signals which are modulated by said modulation means so that a multiplex signal is obtained, said multiplex signal corresponding to the pseudo noise code for a first section with respect to a single chip time of the pseudo noise code, to the same pseudo noise code differing only by a phase and transfer data for each section where a single chip time is divided over a plural number of sections for a second section, and to a code opposite the pseudo noise code for a third section;
a receiver which receives the transmit signal from said transmitter, said receiver having a code signal generating means for generating a second code signal which periodically varies in accordance with the pseudo noise code sequence, synchronizing means for synchronizing the second code signal with one of a plurality of components corresponding to the code signals multiplexed in said transmit signal based on an auto correlation relationship between said second code signal and said transmit signal, and demodulation means for demodulation the transmit signal in synchronization with the second code signal in a state where said synchronizing means synchronizing said second code signal with said one of the plurality of components corresponding to the code signals multiplexed in said transmit signal so that reproducing data corresponding to one of a plurality of data sequences supplied to said transmitter is obtained.

17. A spread spectrum communications system as claimed in claim 16, wherein said first section has a first predetermined value which is a positive value, and said third section has a second predetermined value which is a negative value.

18. A spread spectrum communications system as claimed in claim 16, wherein said first section has a first predetermined value which is a negative value, and said third section has a second predetermined value which is a positive value.

19. The spread spectrum communication system as claimed in claim 16, wherein said modulation means has a shift register which shifts a phase of said first code signal, and generates a delay pseudo noise code which is inputted to said output means.

20. The spread spectrum communication system as claimed in claim 16, wherein said multiplexing means has a multiplexer which selects an output signal corresponding to a predetermined signal.

21. The spread spectrum communication system as claimed in claim 16, wherein said modulation means has an exclusive-OR circuit for said data signal and said first code signal.

22. The spread spectrum communications system as claimed in claim 16, wherein said second code generating means includes a shift register which generates a phase of said pseudo noise code corresponding to each data channel of said transmit signal.

23. The spread spectrum communications system as claimed in claim 16, wherein said demodulation means includes a plural number of correlators for demodulating several data in said one chip of said pseudo noise.

* * * * *